United States Patent
Absar

(12) 
(10) Patent No.: US 8,935,684 B2
(45) Date of Patent: Jan. 13, 2015

(54) LOOP INVARIANT METHOD EXPRESSION HOISTING

(71) Applicant: Advanced Micro Devices, Inc., Sunnyvale, CA (US)

(72) Inventor: Mohammed Javed Absar, Bangalore (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/713,521

(22) Filed: Dec. 13, 2012

(65) Prior Publication Data

US 2014/0173576 A1    Jun. 19, 2014

(51) Int. Cl.
  G06F 9/45        (2006.01)
(52) U.S. Cl.
  CPC .................................... *G06F 8/4441* (2013.01)
  USPC ......................................................... 717/160
(58) Field of Classification Search
  None
  See application file for complete search history.

(56) References Cited

U.S. PATENT DOCUMENTS

| 7,395,419 | B1* | 7/2008 | Gonion | 712/241 |
| 8,510,709 | B2* | 8/2013 | Bordelon et al. | 717/109 |
| 2006/0048121 | A1* | 3/2006 | Blainey et al. | 717/160 |
| 2012/0216012 | A1* | 8/2012 | Vorbach et al. | 712/11 |

OTHER PUBLICATIONS

Optimized Unrolling of Nested Loops, Sarkar, ACM 2000.*
Compiler-Based Approach for Exploiting Scratch-Pad in Presence of Irregular Array Access, Absar, et al., IEEE 2005.*
A Method for Estimating Optimal Unrolling Times for Nested Loops, Koseki et al., IEEE 1997.*
Aho, Alfred V. et al., Compilers: Principles, Techniques, and Tools, Loop invariant code motion, 1986.

* cited by examiner

*Primary Examiner* — Don Wong
*Assistant Examiner* — Daxin Wu
(74) *Attorney, Agent, or Firm* — Volpe and Koenig, P.C.

(57) ABSTRACT

A system, method and computer-readable medium are disclosed for improving the performance of a compiler. A set of source code instructions are processed to generate a plurality of source code instruction subsets, each of which is respectively associated with a mathematical operator. The source code subsets are then reordered to "hoist," or place, a source code instruction subset associated with a product operator before a source code instruction subset associated with a summation operator. The plurality of source code instruction subsets are iteratively reordered until no source code instruction subset associated with a summation operator precedes a source code instruction subset associated with a product operator. A compiler is then used to compile the resulting reordered plurality of source code instruction subsets into a set of optimized object code instructions.

9 Claims, 7 Drawing Sheets

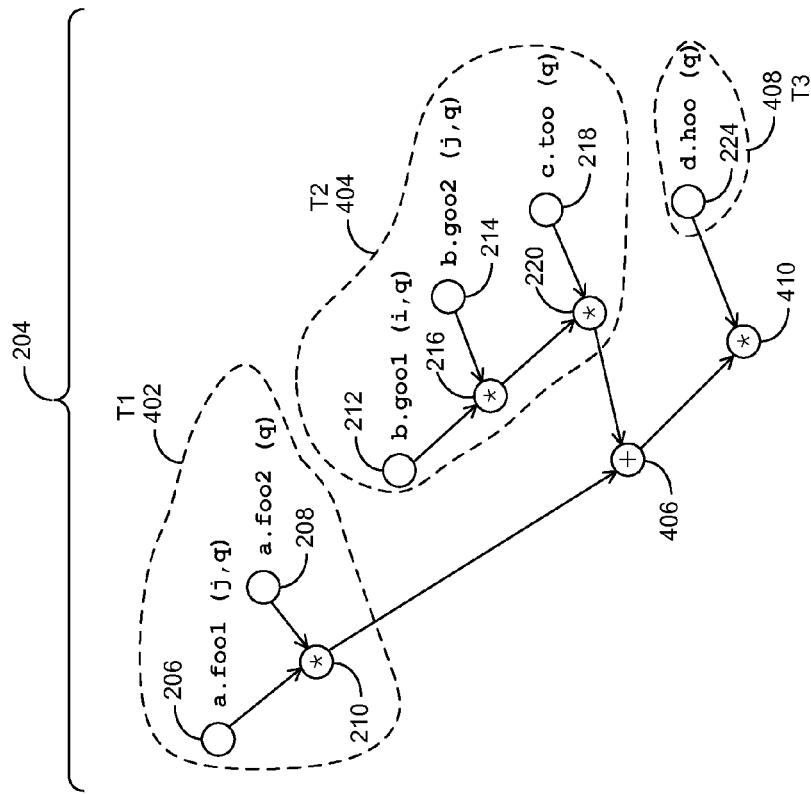

LOOP INVARIANT METHOD EXPRESSION HOISTING

TECHNICAL FIELD

The disclosed embodiments relate generally to information processing systems. More specifically, the disclosed embodiments provide a system, method and computer-readable medium for improving the performance of a compiler.

BACKGROUND

A compiler is a computer program that transforms source code into object code. The source code is typically written in a programming language and the object code is specific to the underlying hardware of a target information processing system. As such, compilers enable the development of programs that are hardware-independent.

When it is executing, the compiler first syntactically parses the source code statements one after the other. Then, in one or more successive passes, it generates the object code, making sure that statements that reference other statements are referred to correctly. The resulting object code comprises machine code that a target processor can process or execute one instruction at a time.

It is common to assess the performance of such compilers through the use of specialized "benchmark" programs, which provide insight into the various operations performed by a compiler. In turn, these insights are then used by compiler developers to optimize the performance of the compiler. As an example, redundant operations or computations in the source code may be identified that could be restructured, or transformed, to be more efficient, but which give the same output. Once it is determined which generic restructures or transformations improve the operation of the source code, they are then implemented in the compiler. However, performing such operations may cause unintended consequences. As an example, when manipulating C++ code, an innocent looking '*' may not be a simple multiplier, but may be an overloaded operator* ( . . . ) where the operator can have more than one meaning. Consequently, addition and multiplication operations may not follow the associative, commutative and hence, distributive manipulation laws of arithmetic.

SUMMARY OF EMBODIMENTS

A system, method and computer-readable medium are disclosed for improving the performance of a compiler. In some embodiments, a set of source code instructions are processed to generate a plurality of source code instruction subsets, each of which is respectively associated with a mathematical operator. The source code subsets are then reordered to "hoist," or place, a source code instruction subset associated with a product operator before a source code instruction subset associated with a summation operator. In some embodiments, the plurality of source code instruction subsets are iteratively reordered until no source code instruction subset associated with a summation operator precedes a source code instruction subset associated with a product operator. A compiler is then used to compile the resulting reordered plurality of source code instruction subsets into a set of optimized object code instructions.

In some embodiments, the reordering of the plurality of source code instruction subsets is expressed as an expression tree in a sum-of-products (SOP) form. In these embodiments, the SOP expression tree is flattened by first traversing the tree to gather information, which is then used to generate an array of sums-of-products. The array of sums-of-products is then processed to generate a plurality of partial expressions, each of which has a respective variance value. The partial expressions are then sorted according to their variance values. Once sorted, they are compiled in their sorted order by a compiler to generate optimized object code.

BRIEF DESCRIPTION OF THE DRAWINGS

The disclosed embodiments may be better understood, and its numerous objects, features and advantages made apparent to those skilled in the art by referencing the accompanying drawings. The use of the same reference number throughout the several figures designates a like or similar element.

FIG. 4 shows a canonical sum-of-products (SOP) expression tree resulting from the conversion of an expression tree, in accordance with some embodiments.

FIG. 5 shows a revised canonical SOP expression tree, in accordance with some embodiments.

FIG. 6 shows the flattening of an expression tree into an SOP expression tree, in accordance with some embodiments.

DETAILED DESCRIPTION

A system, method and computer-readable medium are disclosed for improving the performance of a compiler. Some illustrative embodiments will now be described in detail with reference to the accompanying figures. While various details are set forth in the following description, it will be appreciated that some embodiments may be practiced without these specific details, and that numerous implementation-specific decisions may be made to the embodiments described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the embodiments. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system or similar electronic computing device, that manipulates and transforms data represented as physical (electronic) quantities within the system's registers and memories into other data similarly represented as physical quantities within the system memories or registers or other such information storage, transmission or display devices.

Figure 1:
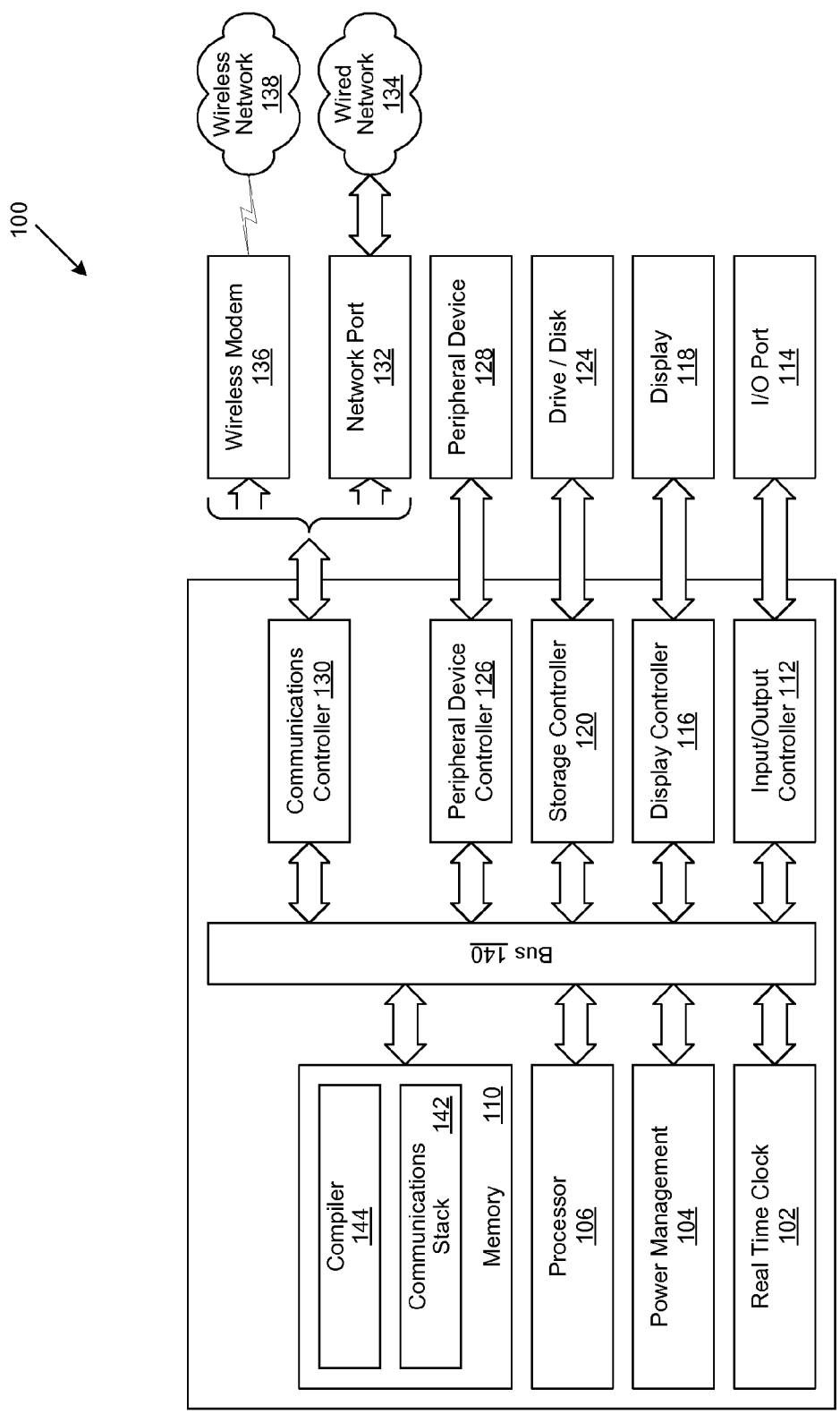
FIG. 1 is a generalized block diagram illustrating an information processing system, in accordance with some embodiments.

FIG. 1 is a generalized block diagram illustrating an information processing system 100, in accordance with some embodiments. Information processing system 100 comprises a real-time clock 102, a power management module 104, a processor 106 and memory 110, all physically coupled via bus 140. In some embodiments, memory 110 comprises volatile random access memory (RAM), non-volatile read-only memory (ROM), non-volatile flash memory, or any combination thereof. In some embodiments, memory 110 also comprises a communications stack 142 and a compiler 144.

Also physically coupled to bus 140 is an input/out (I/O) controller 112, further coupled to a plurality of I/O ports 114. In some embodiments, I/O ports 114 may comprise a keyboard port, a mouse port, a parallel communications port, an RS-232 serial communications port, a gaming port, a universal serial bus (USB) port, an IEEE1394 (Firewire) port, or any combination thereof. Display controller 116 is likewise physically coupled to bus 140 and further coupled to display 118. In some embodiments, display 118 is separately coupled, such as a stand-alone, flat panel video monitor. In some embodiments, display 118 is directly coupled, such as the screen of a laptop computer, a tablet PC, smart television, mobile phone, or of a personal digital assistant (PDA). Likewise physically coupled to bus 140 is storage controller 120 which is further coupled to mass storage devices such as a tape drive or hard disk 124. Peripheral device controller 126 is also physically coupled to bus 140 and further coupled to peripheral device 128, such as a random array of independent disk (RAID) array or a storage area network (SAN).

In some embodiments, communications controller 130 is physically coupled to bus 140 and is further coupled to network port 132, which in turn couples the information processing system 100 to one or more physical networks 134, such as a local area network (LAN) based on the Ethernet standard. In some embodiments, network port 132 may comprise a digital subscriber line (DSL) modem, cable modem, or other broadband communications system operable to connect the information processing system 100 to the one or more physical networks 134. In these embodiments, the one or more physical networks 134 may comprise the public switched telephone network (PSTN), the public Internet, a corporate intranet, a virtual private network (VPN), or any combination of telecommunication technologies and protocols operable to establish a network connection for the exchange of information.

In some embodiments, communications controller 130 is likewise physically coupled to bus 140 and is further coupled to wireless modem 136, which in turn couples the information processing system 100 to one or more wireless networks 138. In some embodiments, wireless network 138 comprises a personal area network (PAN), based on technologies such as Bluetooth or Ultra Wideband (UWB). In some embodiments, wireless network 138 comprises a wireless local area network (WLAN), based on variations of the IEEE 802.11 specification, often referred to as WiFi. In some embodiments, wireless network 138 comprises a wireless wide area network (WWAN) based on an industry standard including two and a half generation (2.5G) wireless technologies such as global system for mobile communications (GPRS) and enhanced data rates for GSM evolution (EDGE). In some embodiments, wireless network 138 comprises WWANs based on existing third generation (3G) wireless technologies including universal mobile telecommunications system (UMTS) and wideband code division multiple access (W-CDMA). Some embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Figure 2:
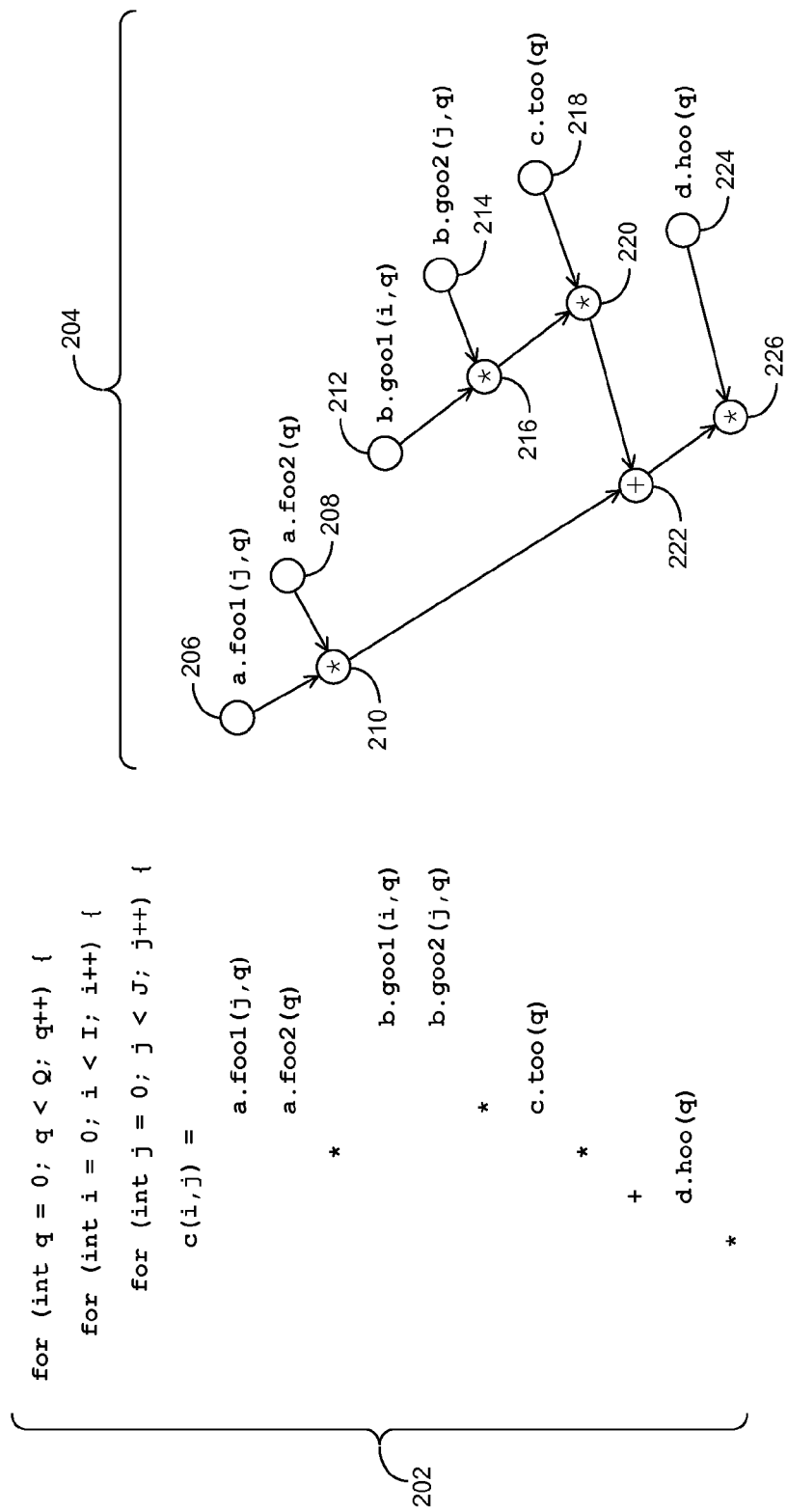
FIG. 2 shows an expression tree corresponding to a representative test code listing, in accordance with some embodiments.

FIG. 2 shows an expression tree corresponding to a representative test code listing, as implemented in accordance with some embodiments. Skilled practitioners of the art will be aware that care must be taken when manipulating C++ code, as an innocent looking '*' may not be a simple multiplier, but an overloaded operator* ( . . . ) instead. Consequently, addition and multiplication operations may not follow the associative, commutative and hence, distributive manipulation laws of arithmetic. As an example, the code listing shown below is a kernel of a C++ library targeted at adaptive finite element analysis and error estimation, which uses C++ programming concepts such as templates and polymorphism, including the Boost library.

```
for (unsigned int q_point=0; q_point<n_q_points; ++q_point)
    for (unsigned int i=0; i<dofs_per_cell; ++i)
        for (unsigned int j=0; j<dofs_per_cell; ++J)
            cell_matrix(i,j) += ((fe_values.shape_grad(i,q_point) *
                fe_vales.xhape_grad(j,q_point) *
                laplace_coefficients [q_point]
                +
                fe_values.shape_value(i,q_point) *
                fe_values.shape_value(j,q_point) *
                mass_coefficients[q_point]
            ) *
            fe_values.JxW(q_point));
```

Furthermore, operators such as mass_coefficients [q_point] are actually calls to function. Nonetheless, those of skill in the art will recognize that there is an optimization opportunity in the above kernel. For example, fe_values.shape_grad(i,q_point) is invariant to the j-loop, and as a result, it can be "hoisted" outside of the j-loop. In some embodiments, hoisting the loop-invariant computations can result in performance improvement. As an example, the computation mass_coefficients[q_point]*fe_values.JxW (q_point) can be hoisted into the q-loop body, which is outside and above the i-loop. By doing so, the computations performed in the innermost loop are reduced, resulting in improved performance.

To further illustrate these embodiments, the manually-transformed code is shown below:

```
for (unsigned int q_point=0; q_point<n_q_points; ++q_point)
{
    double t1 = laplace_coefficients[q_point]   * fevalues.JxW(q_point);
    double t2 = mass_coefficients[q_point]      * fevalues.JxW(q_point);
        for (unsigned int i=0; i<dofs_per_cell; ++i)
        {
            Tensor<1   t3 = fe_values.shape_grad(i,q_point) *
            double     t4 = fe_values.shape_value(i,q_point)*t2;
        for (unsigned int j=0; j<dofs_per_cell; ++j)
        {
            cell_matrix(i,j) += (t3*fe_values.shape_grad(j,q_point))*t1
                +
                fe_values.JxW(q_point));
```

From the foregoing, the problem definition can be broken into two elements. First, generalizing the transformations illustrated above such that similar bodies of code can benefit from optimization in an optimizing compiler, and second, how may such generalized transformations be implemented within the compiler.

The following test code listing 202 for a generalized test case, which is shown in FIG. 2, is used to illustrate the approaches described in greater detail herein:

```
for (int q = 0; q < Q; q++) {
    for (int i = 0; i < I; i++) {
        for (int j = 0; j < J; j++) {
            c(i,j) = (a.f001(j,q)*a.foo2(q)
                    +b.goo1(i,q)*b.goo2(j,q)*c.too(q)
                    ) * d.hoo(q);
        }
    }
}
```

To realize the benefits of these approaches, this code will need to be transformed (e.g., by hoisting calls and partial expressions) so as to minimize the work done in the innermost blocks. As used herein, a partial expression refers to a sub-expression, such as d.hoo(q). The desired target equivalent code for the compiler to generate is shown below:

```
for (int q = 0; q < Q; q++) {
    double t1 = a.foo2(q) * d.hoo(q);
    double t2 = c.too(q) * d.hoo(q);
    for (int i = 0; i < I; i++) {
        double t3 = b.foo1(i,q)*t2;
        for (int j = 0; j < J; j++) {
            c(i,j) = (a.f001(j,q)*t1 + b.goo2(j,q) * t3;
        }
    }
}
```

As shown above, the call that was hoisted and partial expressions that were created will minimize work in the innermost loop body.

Referring now to FIG. 2, a test code listing 202 is graphically illustrated in its corresponding expression tree 204, which comprises a plurality of nodes. As shown in FIG. 2, function calls a.f001(j,q), a.foo2(q), b.goo1(i,q), b.goo2(j,q), c.too(q) and d.hoo(q) respectively correspond to nodes 206, 208, 212, 214, 218 and 224. As likewise shown in FIG. 2, multiplier ('*') operators correspond to nodes 210, 216, 220 and 222, while an addition ('+') operator corresponds to node 226. From the foregoing, it will be apparent that all function calls and computations are done in the innermost loop body.

In some embodiments, a perfect loop nest is first identified. As used herein, a perfect loop nest refers to a collection of loops such that there is a single outer loop statement and the body of every loop is either exactly one loop or is a sequence of non-loop statements. In these, a number of checks are performed to ensure that iterators are initialized and incremented as required, and the end comparator is invariant. In these embodiments, function calls that are invariant are recognized by matching iterators to function call arguments and are then marked as "hoistable," along with the level of invariance. The function calls are hoisted first and the partial function calls are hoisted thereafter, such that values are read before compilation. As used herein, "hoisted" refers to moving a function call from an inner loop to an outer loop. In doing so, the return value of the hoisted function call still produces the same result as if it had not been hoisted. In some embodiments, new blocks are created and then inserted into loop-bodies to capture the hoisted codes, which makes it easier to analyze the hoisted code.

Figure 3:
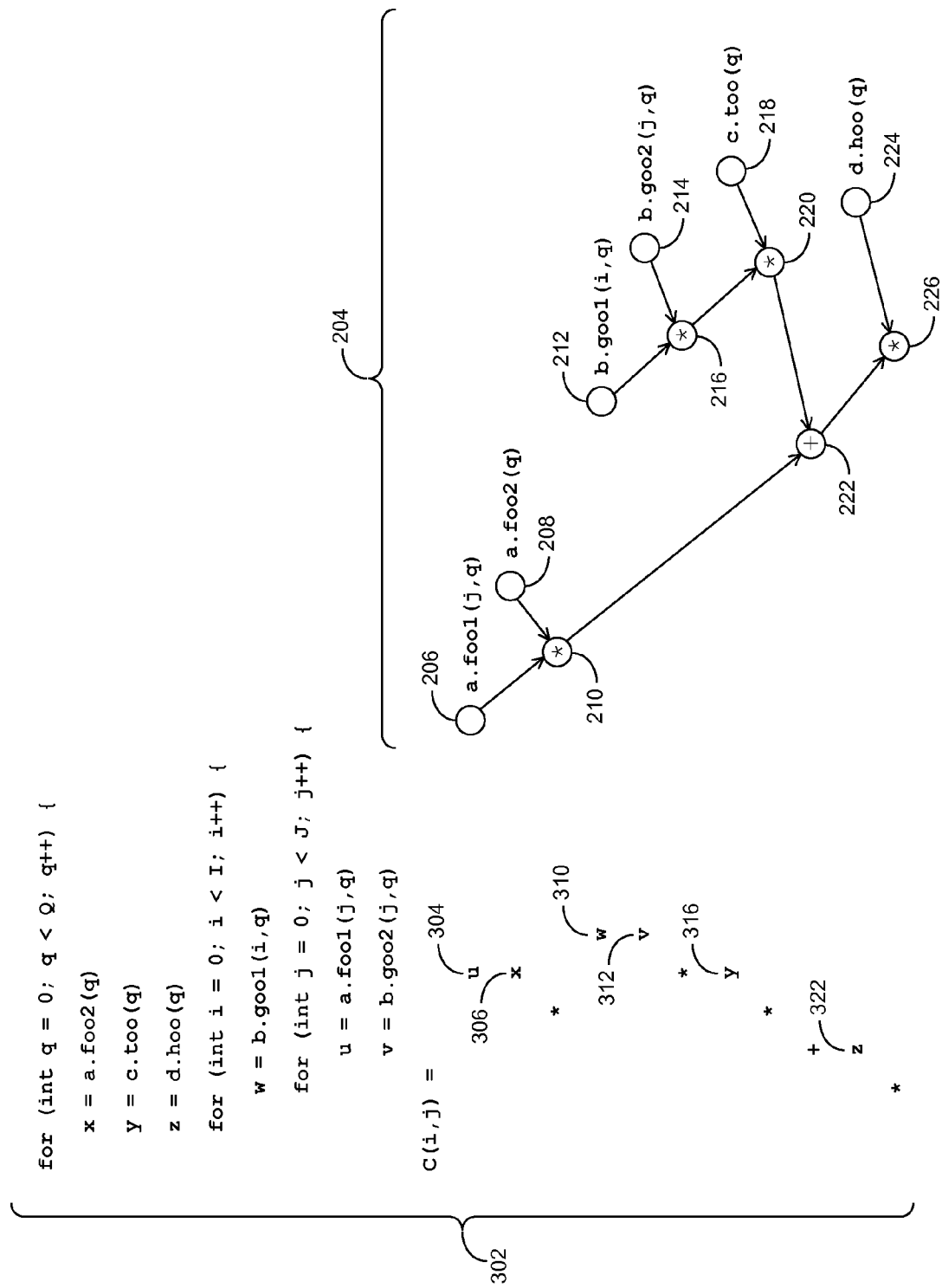
FIG. 3 shows an expression tree corresponding to a representative test code listing that has been revised, in accordance with some embodiments.
Figure 9:
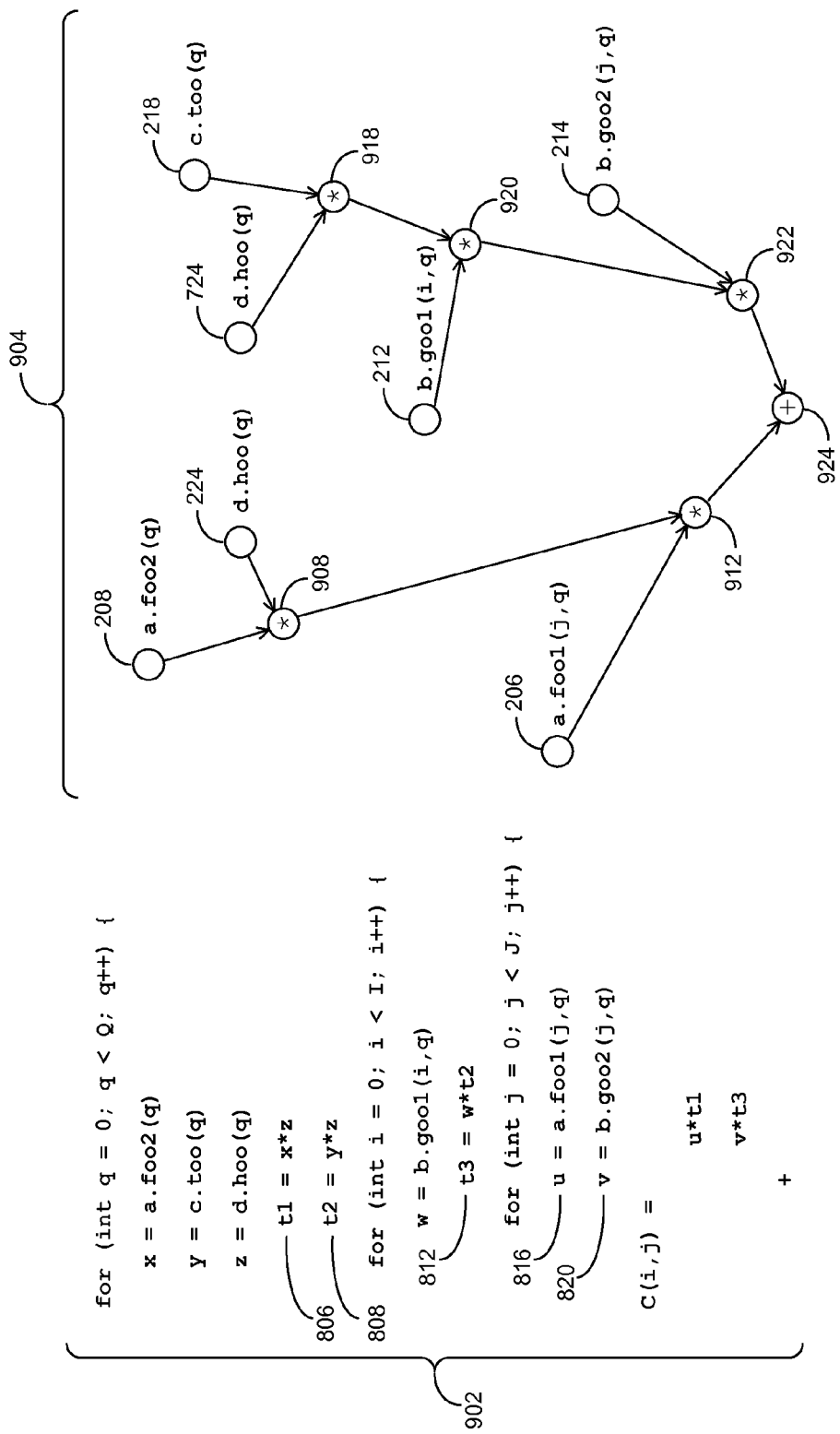
FIG. 9 shows an expression tree corresponding to a representative test code listing that has been revised into an SOP form and then sorted, in accordance with some embodiments.

FIG. 3 shows an expression tree corresponding to a representative test code listing that has been revised, in accordance with some embodiments, prior to the performance of hoisting operations shown in FIG. 9. As shown in FIG. 3, a revised test code listing 302 is graphically illustrated in its corresponding expression tree 204, which comprises a plurality of nodes. As likewise shown in FIG. 3, function calls a.f001(j,q), a.foo2 (q), b.goo1(i,q), b.goo2(j,q), c.too(q) and d.hoo(q) correspond to nodes 206, 208, 212, 214, 218 and 224. As shown in FIG. 3, function calls a.foo2(q), c.too(q), d.hoo(q), b.goo1(i, q), a.f001(j,q) and b.goo2(j,q) have respectively been set to variables 'x', 'y', 'z', 'w', 'u' and 'v' within the revised test code listing 302. Likewise, these function calls have been hoisted to their appropriate level of invariance, such that value 'u' 304, 'x' 306, 'w' 310, 'v' 312, 'y' 316 and 'z' 322 correspond to nodes 206, 208, 212, 214, 218 and 224. Those of skill in the art will recognize that the entire expression is still evaluated in the innermost loop body.

FIG. 4 shows a canonical sum-of-products (SOP) expression tree resulting from the conversion of an expression tree, in accordance with some embodiments. In some embodiments, the elements of an expression that should be hoisted are determined by first converting an expression tree, such as the expression tree shown in FIGS. 2 and 3, into a canonical SOP expression tree. As shown in FIG. 4, nodes t1 402 and t2 404 are summed at node 406. In turn, the product of the resulting sum and node t3 408 is determined at node 410. In these embodiments, once the expression tree has been converted into a canonical SOP expression tree, the expression tree is then flattened, its associated SOP expression is sorted, and group variance is used to create partial expressions as described in more detail below with reference to FIGS. 6-9 below.

FIG. 5 shows a revised canonical sum-of-products (SOP) expression tree, as implemented in accordance with some embodiments. In some embodiments, the expression tree undergoes a series of transformations wherein functions associated with each multiplication ('*') node that resides below a summation ('+') node is "hoisted," or inverted upwards within the expression tree. In these embodiments, the process of "hoisting," or "inverting," is repeated until no '+' node is above an '*' node in the resulting expression tree. Once that occurs, the expression tree has been converted into SOP form. As shown in FIG. 5, the product of nodes t1 402 and t3 408 is determined at node 506. Likewise, the product of node t2 404 and t3 508, which is the equivalent of node t3 408, is determined at node 510. In turn, the products determined at nodes 506 and 510 are then summed at node 512.

FIG. 6 shows the flattening of an expression tree into a sum-of-products (SOP) expression tree, as implemented in accordance with some embodiments. In some embodiments, the expression tree 204 is flattened by traversing the expression tree 204 and accumulating various information into an array of sums-of-products. Skilled practitioners of the art will realize that a product is simply an array of terms, which in turn are iterators or return value of functions. These same skilled practitioners of the art will also recognize the variance, dependent upon the loop iterator, can be added to each term. In some embodiments, the data structure sum-of-products (SOP) and products are expressed as the flattened SOP:

a.foo1[i,q]*a.foo[q]*d.hoo[q]+n.goo1[i.q]*b.goo2[i.q]* c.too[q]*d.hoo[q]

In this flattened SOP, each term is shown as the function call whose value forms the term. For example, a. foo1[j, q] means the return value of a.foo(j.q).

Referring now to FIG. 6, the product of function calls a.f001(j,q) and a.foo2(q), respectively corresponding to nodes 206 and 208, is determined at node 210. This product is then flattened to sum-of-products node t1 402. Likewise, the product of function calls b.goo1(i,q) and b.goo2(j,q), respectively corresponding to nodes 212 and 214, is determined at node 216, which is then multiplied with function call c.too(q), corresponding to node 218, whose product is then determined at node 220. This product is then flattened to sum-of-products node t2 404. The function call d.hoo(q), corresponding to node 224, is likewise flattened to sum-of-products node t3 408. In turn, sum-of-products nodes t1 402 and t2 404 are summed at node 406, and a resulting product is determined at node 410 by multiplying the value of node 406 by the value of sum-of-product node t3 408.

Figure 7:
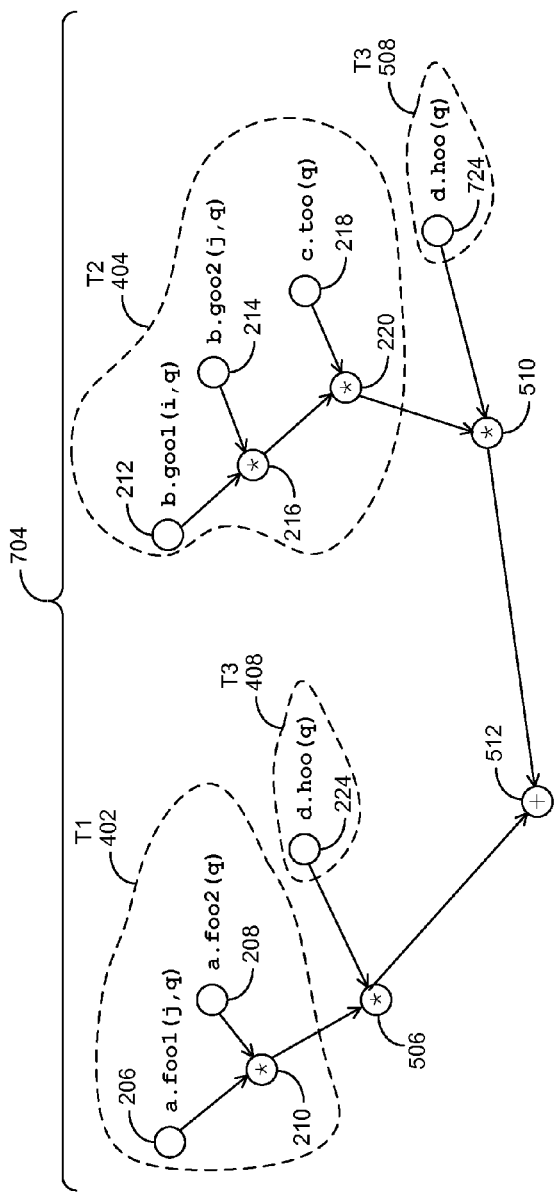
FIG. 7 shows the flattening of a revised expression tree into an SOP expression tree, in accordance with some embodiments.

FIG. 7 shows the flattening of a revised expression tree into a sum-of-products-form expression tree, as implemented in accordance with some embodiments. In these embodiments, a revised expression tree 704 is flattened by traversing the expression tree 704 and accumulating various information into an array of sums-of-products. Referring now to FIG. 7, the product of function calls a.f001(j,q) and a.foo2(q), respectively corresponding to nodes 206 and 208, is determined at node 201. This product is then flattened to sum-of-products node t1 402. The function call d.hoo(q), corresponding to node 224, is likewise flattened to sum-of-products node t3 408. Likewise, the product of function calls b.goo1(i,q) and b.goo2(j,q), respectively corresponding to nodes 212 and 214, determined at node 216, which is then multiplied with function call c.too(q), corresponding to node 218, whose product is then determined at node 220. This product is then flattened to sum-of-products node t2 404. The function call d.hoo(q), corresponding to node 724 and equivalent to node 224, is likewise flattened to sum-of-products node t3 508. In turn, sum-of-products nodes t1 402 and t2 404 are multiplied to generate a product at node 506, and sum-of-products nodes t2 404 and t3 508 are multiplied to generate a product at node 510. A resulting sum is determined at node 512 by adding the value of sum-of-products node 506 and the value of sum-of-product node 510.

Figure 8:
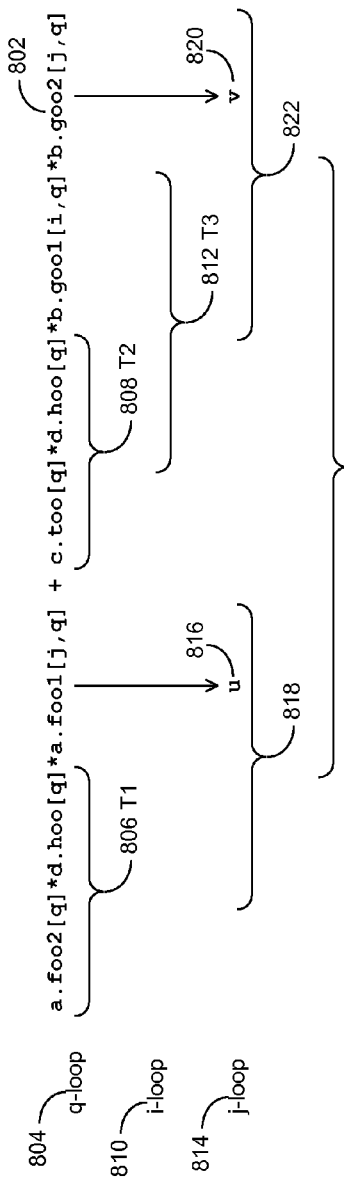
FIG. 8 is a generalized depiction of sorting operations performed on a flattened SOP expression, in accordance with some embodiments.

FIG. 8 is a generalized depiction of sorting operations performed on a flattened sum-of-products (SOP) expression, as implemented in accordance with some embodiments. Referring to FIG. 8, it will be apparent that the SOP expression 802 comprises a plurality of calls, each of which has a corresponding variance (e.g., a. foo1(i,j) is invariant to 'q'). In these embodiments, the SOP expression 802 is first sorted, based upon the variance of terms associated with each of its calls.

As shown in FIG. 8, partial expressions can be picked by traversing the flattened and sorted SOP expression 802. As an example, a.foo2[q]*d.hoo[q] (t1) 806 and c.too[q]*d.hoo[q] (g1) 808 can be computed in the q-loop 804. The resulting product t2 808 can then be multiplied by b. goo1[i,q]*hoo[q] to determine the value of t3 812 in the i-loop 810. Then, in the j-loop, the product 818 is determined by multiplying t1 806 by the value of 'u' 816, and the product 822 is determined by multiplying t3 812 by the value of 'v' 820. The product 818 and product 822 are then added to determine their sum 824.

FIG. 9 shows an expression tree corresponding to a representative test code listing that has been revised into sum-of-products (SOP) form and then sorted, in accordance with some embodiments. As shown in FIG. 9, a revised and sorted test code listing 902, which corresponds to expression 802 described in the descriptive text associated with FIG. 8, is graphically illustrated in its corresponding expression tree 904.

As shown in FIG. 9, function calls a.foo1(j,q), a.foo2(q), b.goo1(i,q), b.goo2(j,q), c.too(q) and d.hoo(q) correspond to nodes 206, 208, 212, 214, 218 and 224. As likewise shown in FIG. 9, function calls a.foo2(q), c.too(q), d.hoo(q), b.goo1(i, q), a.foo1(j,q) and b.goo2(j,q) have respectively been set to values 'x', 'y', 'z', 'w', 'u' and 'v' within the revised and sorted test code listing 302. As described in greater detail in the descriptive text associated with FIG. 8, the product of function calls a. foo2(j,q) and a.foo2(q), respectively corresponding to nodes 208 and 210, is determined at node 908, which corresponds to the sum-of-products (SOP) node t1 806.

Likewise, the product of function calls d.hoo(q) and c.goo (q), respectively corresponding to nodes 724 and 214, is determined at node 918, which corresponds to the SOP node t2 808. The product of node 918 and function call b.goo1(i,q), corresponding to node 212, is then determined at node 920, which corresponds to SOP node t3 812. In turn, the value of function call a.foo1(j,q) is set to 'u' 816 the value of function call b.goo2(j,q) is set to 'b' 820. The product of node 908 and function call a.foo1(j,q), corresponding to node 206 and the value of 'u' 816, is then determined at node 912 and the product of node 920 and function call b.goo2(j,q), corresponding to node 214 and the value of 'v' 820, is determined at node 922. The sum of nodes 912 and node 922 is then determined at node 924.

Figure 10:
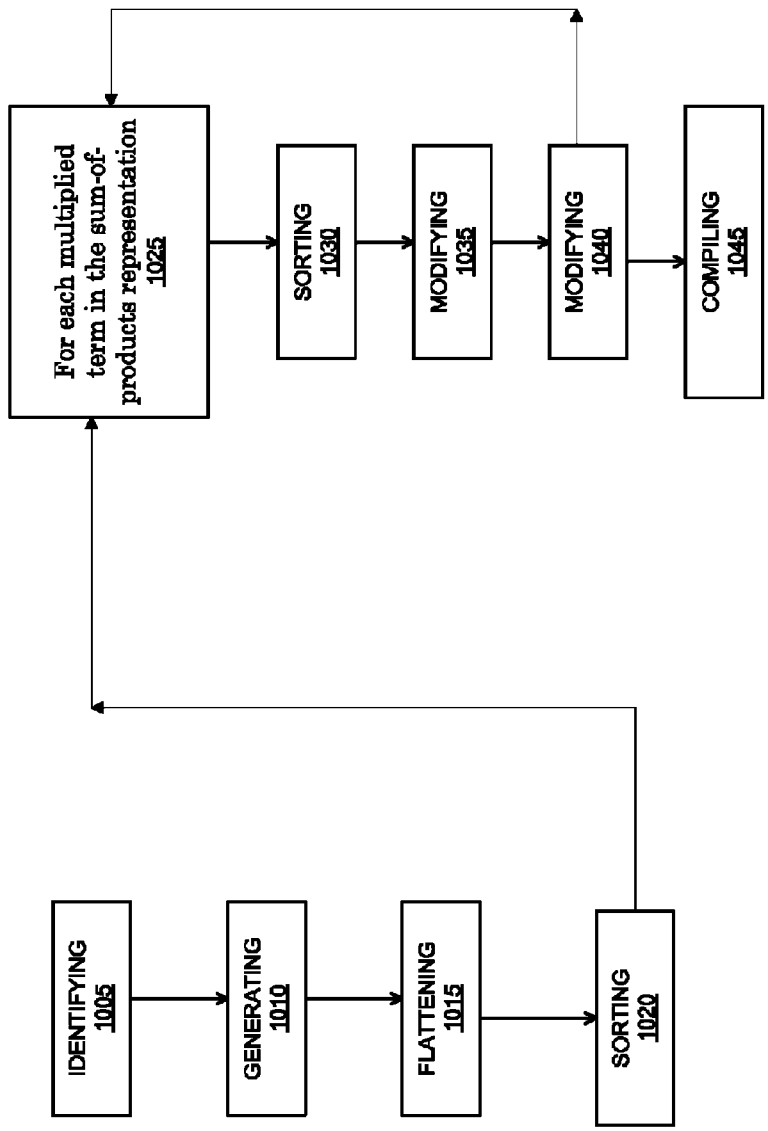
FIG. 10 shows an example flowchart in accordance with some embodiments.

FIG. 10 shows an example flowchart in accordance with some embodiments. In an example method and system for improving the performance of a compiler, the method includes, identifying in step 1005, in source code, an expression that is included in a nested loop, the expression including at least one term that is dependent on at least one iterator variable of the nested loop. The method then generates a sum-of-products (SOP) representation of the expression in step 1010, the sum-of-products representation including a summation of groups of multiplied terms in the expression, wherein the SOP representation comprises an SOP expression tree. A flattening operation is performed on the SOP expression tree to generate a flattened SOP expression tree in step 1015, the flattening operations comprising traversing the SOP expression tree to generate an array of sums-of-products. A sorting operation is performed on the array of sums-of-products to generate a sorted SOP expression tree in step 1020, wherein sorting comprises generating a plurality of partial expressions respectively comprising a variance value and sorting the partial expressions according to the variance value corresponding to each partial expression. For each multiplied term in the sum-of-products representation in step 1025, the terms in the multiplied term are sorted based on iterator variables of the nested loop in step 1030, the sum-of-products representation are modified to insert the partial expressions in place of the terms that depend on the same iterator variables in step 1035 and the source code is modified in step 1040 so that the partial expressions in the sum-ofproducts representation are moved from an inner loop of the nested loop to an outer loop of the nested loop when the partial expressions do not depend on an iterator variable of the inner loop. The source code is then compiled to produce object code in step 1045.

Skilled practitioners in the art will recognize that many other embodiments and variations are possible. In addition, each of the referenced components in the disclosed embodiments may be comprised of a plurality of components, each interacting with the other in a distributed environment. Furthermore, other embodiments may expand on the disclosed embodiment to extend the scale and reach of the system's implementation.

What is claimed is:

1. A computer-implementable method for improving the performance of a compiler, comprising:
   identifying, in source code, an expression that is included in a nested loop, the expression including at least one term that is dependent on at least one iterator variable of the nested loop;
   generating a sum-of-products (SOP) representation of the expression, the sum-of-products representation including a summation of groups of multiplied terms in the expression, wherein the SOP representation comprises an SOP expression tree;
   flattening operations the SOP expression tree to generate a flattened SOP expression tree, the flattening operations comprising traversing the SOP expression tree to generate an array of sums-of-products;
   sorting on the array of sums-of-products to generate a sorted SOP expression tree, wherein sorting comprises generating a plurality of partial expressions respectively comprising a variance value and sorting the partial expressions according to the variance value corresponding to each partial expression;
   for each multiplied term in the sum-of-products representation,
      sorting terms in the multiplied term based on iterator variables of the nested loop; and
      modifying the sum-of-products representation to insert the partial expressions in place of the terms that depend on the same iterator variables;
   modifying the source code so that the partial expressions in the sum-of-products representation are moved from an inner loop of the nested loop to an outer loop of the nested loop when the partial expressions do not depend on an iterator variable of the inner loop; and
   compiling the source code to produce object code.

2. The method of claim 1, wherein the modifying of the source code is performed iteratively to place all source code instruction subsets associated with a product operator prior to all source code instruction subsets associated with a summation operator.

3. The method of claim 1, wherein the compiler compiles the partial expressions in their sorted order.

4. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
      identifying, in source code, an expression that is included in a nested loop, the expression including at least one term that is dependent on at least one iterator variable of the nested loop;
      generating a sum-of-products (SOP) representation of the expression, the sum-of-products representation including a summation of groups of multiplied terms in the expression, wherein the SOP representation comprises an SOP expression tree;
      flattening operations the SOP expression tree to generate a flattened SOP expression tree, the flattening operations comprising traversing the SOP expression tree to generate an array of sums-of-products;
      sorting on the array of sums-of-products to generate a sorted SOP expression tree, wherein sorting comprises generating a plurality of partial expressions respectively comprising a variance value and sorting the partial expressions according to the variance value corresponding to each partial expression;
      for each multiplied term in the sum-of-products representation,
         sorting terms in the multiplied term based on iterator variables of the nested loop; and
         modifying the sum-of-products representation to insert partial expressions in place of the terms that depend on the same iterator variables;
         modifying the source code so that partial expressions in the sum-of-products representation are moved from an inner loop of the nested loop to an outer loop of the nested loop when the partial expressions do not depend on an iterator variable of the inner loop; and
      compiling the source code to produce object code.

5. The system of claim 4, wherein the modifying of the source code is performed iteratively to place all source code instruction subsets associated with a product operator prior to all source code instruction subsets associated with a summation operator.

6. The system of claim 4, wherein the compiler compiles the partial expressions in their sorted order.

7. A non-transitory, computer-readable storage medium embodying computer program code, the computer program code comprising computer executable instructions configured for:
   identifying, in source code, an expression that is included in a nested loop, the expression including at least one term that is dependent on at least one iterator variable of the nested loop;
   generating a sum-of-products (SOP) representation of the expression, the sum-of-products representation including a summation of groups of multiplied terms in the expression, wherein the SOP representation comprises an SOP expression tree;
   flattening operations the SOP expression tree to generate a flattened SOP expression tree, the flattening operations comprising traversing the SOP expression tree to generate an array of sums-of-products;
   sorting on the array of sums-of-products to generate a sorted SOP expression tree, wherein sorting comprises generating a plurality of partial expressions respectively comprising a variance value and sorting the partial expressions according to the variance value corresponding to each partial expression;
   for each multiplied term in the sum-of-products representation,
      sorting terms in the multiplied term based on iterator variables of the nested loop; and modifying the sum-of-products representation to insert partial expressions in place of the terms that depend on the same iterator variables;

modifying the source code so that partial expressions in the sum-of-products representation are moved from an inner loop of the nested loop to an outer loop of the nested loop when the partial expressions do not depend on an iterator variable of the inner loop; and compiling the source code to produce object code.

8. The non-transitory, computer-readable storage medium of claim 7, wherein the modifying of the source code is performed iteratively to place all source code instruction subsets associated with a product operator prior to all source code instruction subsets associated with a summation operator.

9. The non-transitory, computer-readable storage medium of claim 7, wherein the compiler compiles the partial expressions in their sorted order.

* * * * *

UNITED STATES PATENT AND TRADEMARK OFFICE
CERTIFICATE OF CORRECTION

PATENT NO. : 8,935,684 B2  
APPLICATION NO. : 13/713521  
DATED : January 13, 2015  
INVENTOR(S) : Mohammed Javed Absar Page 1 of 1

It is certified that error appears in the above-identified patent and that said Letters Patent is hereby corrected as shown below:

IN THE CLAIMS

Claim 1, column 9, line 28, after "operations" insert -- on --.

Claim 4, column 10, line 10, after "operations" insert -- on --.

Claim 7, column 10, line 53, after "operations" insert -- on --.

Signed and Sealed this  
Thirtieth Day of June, 2015

Michelle K. Lee  
*Director of the United States Patent and Trademark Office*